UNITED STATES PATENT OFFICE.

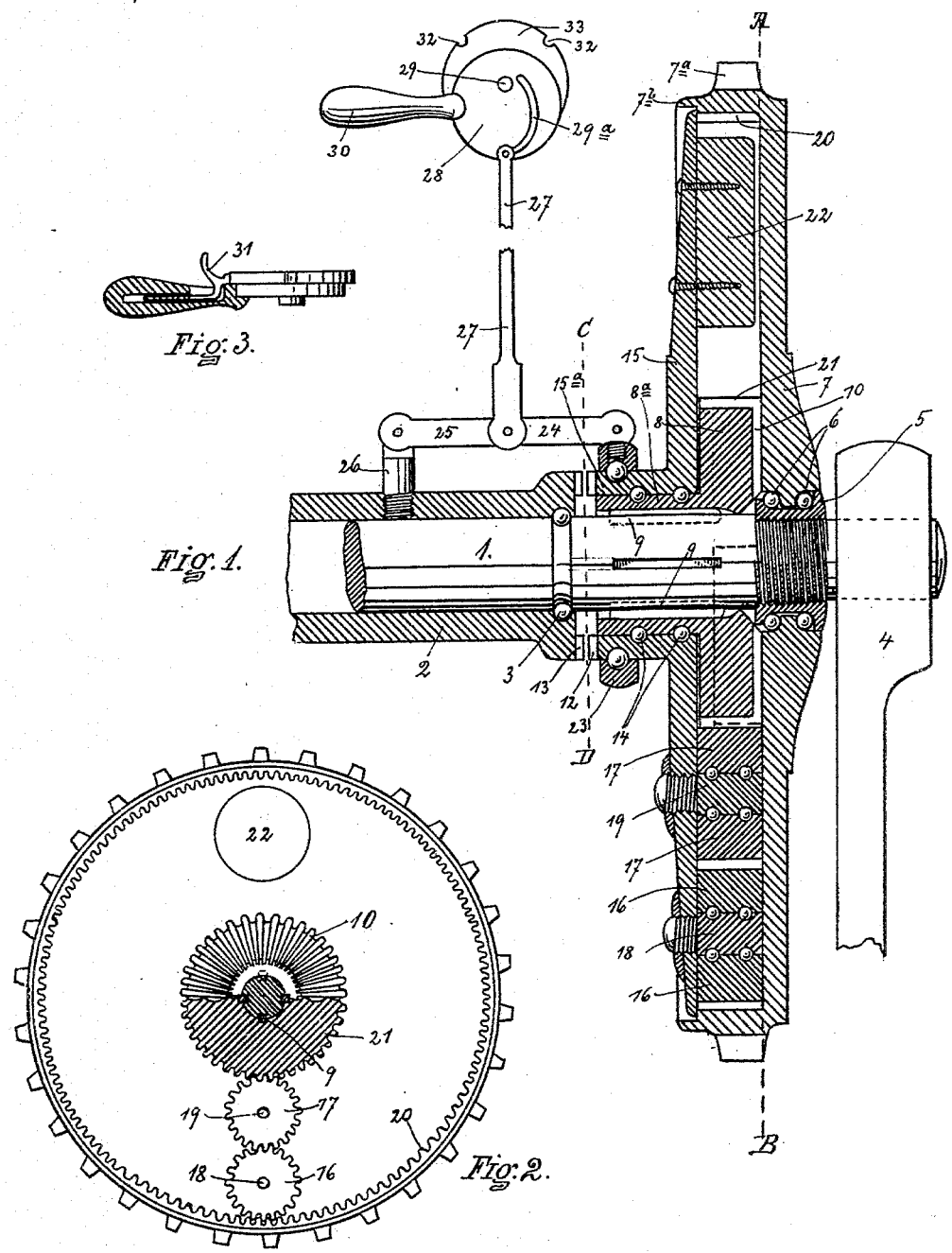

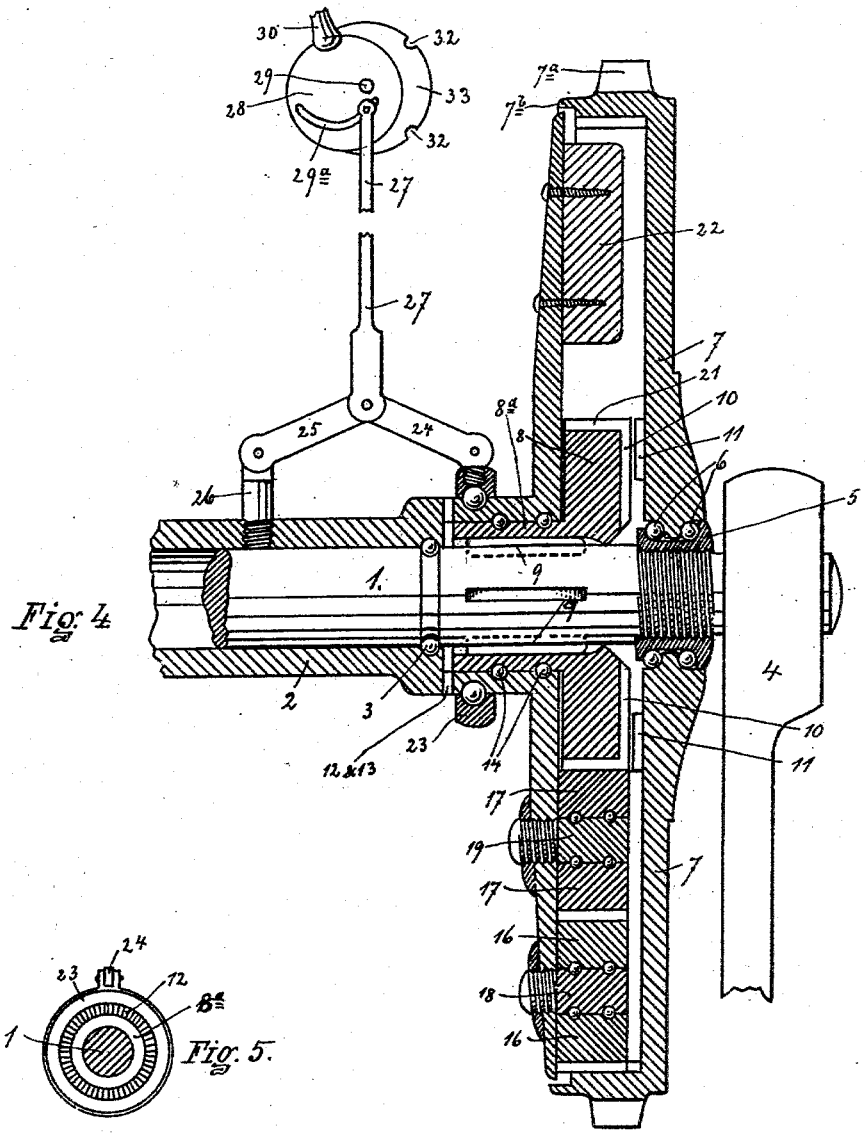

ARTHUR L. EASINGWOOD, OF CLINTON, NEW YORK, ASSIGNOR OF ONE-HALF TO JOSEPH H. BROWN, OF SAME PLACE.

CHANGE-GEAR MECHANISM FOR BICYCLES.

SPECIFICATION forming part of Letters Patent No. 514,452, dated February 13, 1894.

Application filed April 18, 1893. Serial No. 470,821. (No model.)

*To all whom it may concern:*

Be it known that I, ARTHUR L. EASINGWOOD, of Clinton, in the county of Oneida and State of New York, have invented certain new and useful Improvements in Change-Gear Mechanism for Bicycles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My present invention relates to an improvement in change gear mechanism more particularly adapted for use with bicycles.

In the drawings which accompany and form a part of this specification and in which similar figures of reference refer to corresponding parts in the several views, Figure 1 shows a vertical central section of the main driving sprocket of a safety bicycle with the several co-acting parts in the position which they assume when the bicycle is geared to make its highest speed. Fig. 2 shows a partial section and a partial face view of the parts at the left of the line A—B of Fig. 1. Fig. 3 shows details of a cam and handle for operating and securing the movable parts of the device. Fig. 4 shows the same parts shown in Fig. 1 in the position which they assume when the bicycle is geared for its low speed. Fig. 5 shows on a smaller scale, a section taken on line C—D of Fig. 1.

Referring more particularly to the reference numerals marked on the drawings in a more specific description of the device, 1 indicates the driving shaft, as usually provided in a safety bicycle, mounted in a suitable bearing 2 by means of bearing balls 3 in the frame. On the ends of the shaft 1 are provided pedal cranks 4 secured thereto and adapted to rotate the shaft.

5 indicates a bearing collar secured on the shaft 1 and rotating therewith. The bearing collar carries thereon on intermediate bearing balls 6, 6 main driving sprocket or wheel 7. The sprocket 7 is independent of the shaft and collar and free to rotate thereon. On the periphery of the sprocket is provided the sprocket projection 7ª and the sprocket is of a size which will give the machine its highest rate of speed when the sprocket is rotated in unison with the treadle.

Mounted on the shaft 1, partially within the hollow sprocket 7 is provided a hub piece 8 which is secured by means of feathers 9 on the shaft, so as to rotate therewith but capable of a lateral movement on the shaft.

On the hub piece I provide on the end thereof a series of teeth 10 which are adapted to be locked with teeth 11 provided on the inner face of the sprocket 7.

The hub piece 8 is provided with a sleeve-like portion 8ª, and on this sleeve is mounted by means of bearing balls 14, a plate 15 which closes the open side of the sprocket wheel 7, and has mounted thereon transmitting gears 16 and 17 mounted on the pivotal pins 18 and 19 respectively by means of suitable ball bearings. The transmitting gear 16 meshes with the internal teeth 20 at the periphery of the sprocket and the transmitting gear 17 engages with teeth 21 on the periphery of the hub piece 8 and the two transmitting gears intermesh.

On the opposite side of the circular plate 15 from that to which the transmitting gears are pivoted, I provide a counter-weight 22. It may be observed here that instead of the counter-weight, a second set of transmitting gears may be provided if found desirable, and they will to a certain extent equalize the pressure on the side of the shaft.

On the end of the sleeve portion 15ª, I provide a series of teeth 12 adapted to be moved into locking position with the stationary teeth 13 on the end of the bearing 2.

On the sleeve portion 15ª I mount bearing ring 23 by means of suitable balls, and to this bearing ring I attach one arm 24 of a toggle joint, the other arm 25 thereof being pivoted to a fixed support 26 projecting from the bearing 2 or other suitable portion of the frame, and the toggle joint is operated by a connecting rod 27 and swinging plate 28 having a cam groove 29ª in which a projection from the connecting rod 27 engages. The plate 28 is pivoted at 29 to a suitable portion of the frame or fixed support and is operated by a handle 30 and secured in fixed position by a catch 31 engaging in recesses 32 in the edge of a fixed disk or plate 33.

In use the operation of the device is substantially as follows:—When it is desired to obtain a higher rate of speed or gearing, the parts are operated to force the plate 15 and the hub 8 toward the sprocket gear 7, which movement inter-locks the teeth 10 with the teeth 11 and the sprocket then rotates in unison with the crank. The position of the parts being shown fully in Fig. 1. When it is desired to change to the slower gearing, the operating mechanism is brought into use to shift the hub piece toward the left of the shaft, as shown in Fig. 4, which movement disengages the teeth 10 and 11 and interlocks the teeth 12 and 13. The rotation of the shaft then operates to turn the hub 8, which in turn, turns the transmitting gears 17 and 16 and transmits the motion to the periphery of the main sprocket 7. It will be noted that the periphery of the main sprocket will travel at the same rate of speed and in the same direction as the periphery of the hub 8. During the operation of the parts in this position, the plate 15 is held stationary by reason of the interlocking of the teeth 12 and 13. It will be noted that the change of motion can be accomplished without stopping the motion of the parts and it is preferable to provide an entire circle of teeth in each instance, that is, in teeth 10, 11, 12 and 13. It is also evident that several other means for accomplishing the movement of the parts from the locking position on one side to the locking position on the other, other than the toggle joint and connecting mechanism shown, may be employed. I provide on the periphery of the sprocket 7 a lip 7$^b$ which overhangs the open side of the sprocket 7 and is of a width to always close the open side of the sprocket around the edge of the plate 15. As the plate 15 is moved in and out with reference to the main sprocket, the teeth of transmitting gear 16 slide on the internal teeth 20 of the main sprocket.

What I claim as new, and desire to secure by Letters Patent, is—

1. The combination of a shaft, a wheel or sprocket loosely mounted on the shaft having internal gear teeth, a hub piece laterally movable on the shaft, and having projections or teeth adapted to engage the wheel or sprocket, and also peripheral teeth, transmitting gears between the peripheral teeth of the hub piece and the internal teeth of the sprocket or wall, a plate on which the transmitting gears are pivoted, and teeth on the plate adapted to engage fixed teeth, and mechanism for moving the plate and hub piece laterally on the shaft to disengage one set of the teeth and interlock the other, substantially as set forth.

2. The combination of a shaft mounted in a suitable bearing, a wheel or sprocket mounted loosely on the shaft a hub piece laterally movable on the shaft and having laterally extending projections or teeth adapted to engage similar teeth on the sprocket or wheel, and also having peripheral teeth, transmitting gears introduced between the peripheral teeth of the hub piece and the internal teeth of the main sprocket or wheel, a plate loosely mounted on a sleeve-like portion of the hub piece and on which the transmitting gears are pivoted, laterally projecting teeth or projections from the plate carrying the transmitting gears, and similar fixed teeth or projections on the end of the bearing with which the lateral teeth may become locked, and mechanism for moving the parts laterally to disengage one side of the teeth and engage the other side, substantially as set forth.

3. The combination in a change gear mechanism of a shaft, a main wheel or sprocket 7 mounted loosely on the shaft and having internal teeth, a hub piece 8 having a sleeve-like extension mounted on the shaft and having a lateral movement with reference to the shaft, the hub piece having laterally projecting teeth or projections adapted to engage with similar teeth or projections on the sprocket and also having peripheral teeth, and carrying plate 15 mounted independently on the sleeve portion of the hub piece and having teeth thereon, transmitting gears 16 and 17 which mesh with the peripheral teeth of the hub piece and with the internal teeth of the main sprocket, lateral projections or teeth from the sleeve of the plate adapted to engage with fixed teeth or projections from the shaft bearing or other fixed parts, bearing ring mounted on the sleeve-like extension of the carrying plate, and operating mechanism connected with the bearing ring for moving the movable parts laterally on the shaft, to engage one set of teeth and disengage the other set of teeth for producing the changes in motion, substantially as set forth.

In witness whereof I have affixed my signature in presence of two witnesses.

ARTHUR L. EASINGWOOD.

Witnesses:
L. M. MARTIN,
CHARLES IVES.